United States Patent [19]

Fujii et al.

[11] Patent Number: 5,287,761
[45] Date of Patent: Feb. 22, 1994

[54] DEVICE AND METHOD FOR MICRO DISPLACEMENT

[75] Inventors: Hiroyuki Fujii; Mamoru Abe, both of Saitama, Japan

[73] Assignee: Hitachi Metals Ltd., Tokyo, Japan

[21] Appl. No.: 951,114

[22] Filed: Sep. 25, 1992

[30] Foreign Application Priority Data

Sep. 27, 1991 [JP] Japan .................................. 3-248921

[51] Int. Cl.$^5$ ............................................. F16H 1/18
[52] U.S. Cl. ................... 74/424.8 R; 74/110; 359/393; 411/393
[58] Field of Search .......... 74/424.8 R, 89.15, 110; 359/392, 393; 411/393, 324, 433; 403/291; 248/180, 904

[56] References Cited

FOREIGN PATENT DOCUMENTS 52-145057 12/1977 Japan .
61-16716 1/1986 Japan .
63-127869 5/1988 Japan .
3-92264 4/1991 Japan .
3-287368 12/1991 Japan .
4-13093 3/1992 Japan .

Primary Examiner—Rodney H. Bonck
Assistant Examiner—David W. Laub
Attorney, Agent, or Firm—Sughrue, Mion, Zinn, Macpeak & Seas

[57] ABSTRACT

A fine displacement device for establishing a measured micro displacement includes first and second plate members disposed in spaced relation to each other to define a gap therebetween with the plate members being secured to each other at opposed portions thereof. An internally threaded hole is formed through one plate member perpendicular thereto and an externally threaded screw is fastened in the hole with an end of the screw abutting against the other plate member. Upon turning the screw in one direction, the plate members will be deformed elastically in a direction perpendicular to the plate members and a distance between a plane of the first plate member and a deformed portion of the first plate member is used as a measure for establishing the micro displacement.

8 Claims, 1 Drawing Sheet

DEVICE AND METHOD FOR MICRO DISPLACEMENT

BACKGROUND OF THE INVENTION

1. Field of the Invention

The present invention relates to a device and a method to get a micro displacement of length.

2. Description of the Prior Art

A precision in the order of micron or nanometer is necessary when positioning is to be accomplished in such fields as precisely processing machine, precise handling of a device or precise operation of viewing range of a microscope. For the precise positioning of a part of an apparatus, there is required a device attached to or mounted on the part of the apparatus to establish a minute and accurate displacement of the part matching the required positioning precision. There has been sometimes used a piezoelectric element for this purpose. But as the output displacement get by the piezoelectric element is too small, it is generally necessary to convert to magnify the output for the above purpose. And because of necessity for an electric power, the piezoelectric element is troubled in portability.

For precise positioning, therefore, there has been widely used a fine adjusting mechanism to convert to reduce mechanically a large input displacement. In Japanese Patent Laid Open No. 145057/1977, for example, there is disclosed a finely displacing device in which, an input member is so mounted through a first set of rollers on a horizontal plane as to move horizontally. The input member has a slightly inclined upper surface, on which an output member is so mounted through a second set of rollers as to move vertically but not to move horizontally. If the upper surface of the input member has an angle of inclination of $\alpha$, the output member rises by $a \cdot \tan(\alpha)$ for a horizontal movement of $a$ (mm) of the input member. Since the value $\alpha$ is small, the rise $a \cdot \tan(\alpha)$ of the output member is sufficiently small with respect to the horizontal displacement $a$ of the input member. Thus, the fine displacement of the length is established.

However, the finely displacing device described above is required to manufacture the first and second sets of rollers precisely into cylindrical shapes and to precisely flatly work the faces of the input and output members contacting with the two sets of rollers. There is another problem that this device has its mounting posture to the part of the apparatus limited, that is, we can get only the vertical displacement by this device.

SUMMARY OF THE INVENTION

It is, therefore, an object of the present invention to provide a device and a method to get a micro displacement of length, which is single in construction, easy in manufacture, excellent in portability and excellent in operability having no limit for the mounting posture.

According to a feature of the present invention, there is provided a finely displacing device and a method for establishing a micro displacement of length, characterized in comprising: first and second members arranged to face each other in their thickness directions and fixed directly or indirectly to each other in their portions; and input means for changing gap between the two members by deforming the same elastically, wherein distance between the mutually fixed portions and a portion of the first member other than its fixed portion, as taken in the thickness direction of the two members, is used as a length for establishing the micro displacement.

With this construction, let it be assumed that when the two members are elastically deformed by the operation of the input means to change the gap between the two members, the distance in the thickness direction between the fixed portion and the portion of the first member other than the fixed portion changes by $\Delta h_1$. Then the distance between the fixed portion and the portion of the second member corresponding to the portion of the first member where the value $\Delta h_1$, is measured, will also change to the opposite direction to $\Delta h_1$, and let this displacement of the second member be $\Delta h_2$. In other words, the distance of the portions under consideration between the two members is elastically deformed by the total displacement of $\Delta h$, where $\Delta h = \Delta h_1 + \Delta h_2$, by the operation of the input means. On the other hand, what is taken out as the output displacement is the value $\Delta h_1$. Thus, even if the total elastic distortion of $\Delta h$ obtained by the input means is relatively high, it is reduced at the rate of $\Delta h_1 / \Delta h$, that is, the ratio of the elastic displacement $\Delta h_1$ of the first member to the total elastic displacement $\Delta h$ of the two members, and the micro displacement can be achieved as the output.

DETAILED DESCRIPTION OF THE PREFERRED EMBODIMENT

Figure 1:
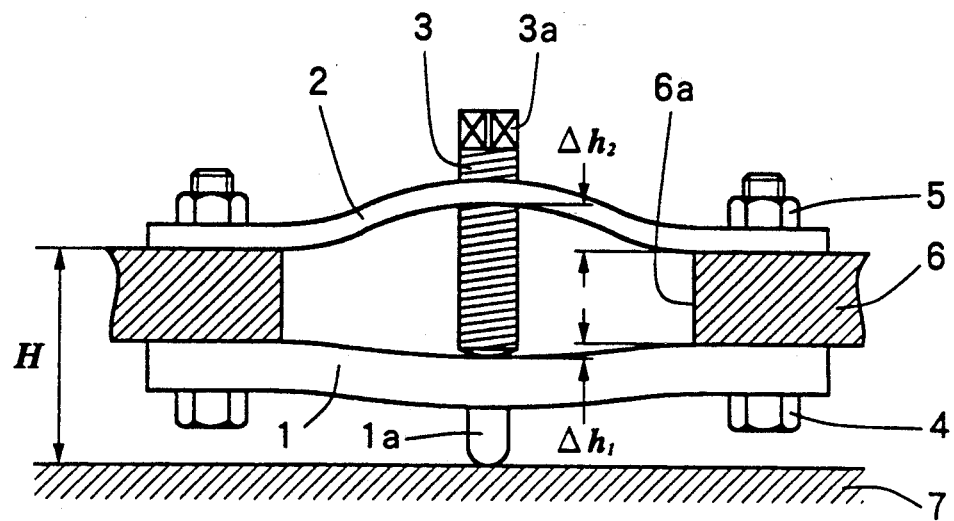
FIG. 1 is a front elevation showing a finely displacing device according to one embodiment of the present invention and taken in the direction of arrow 1—1 of FIG. 2.
Figure 2:
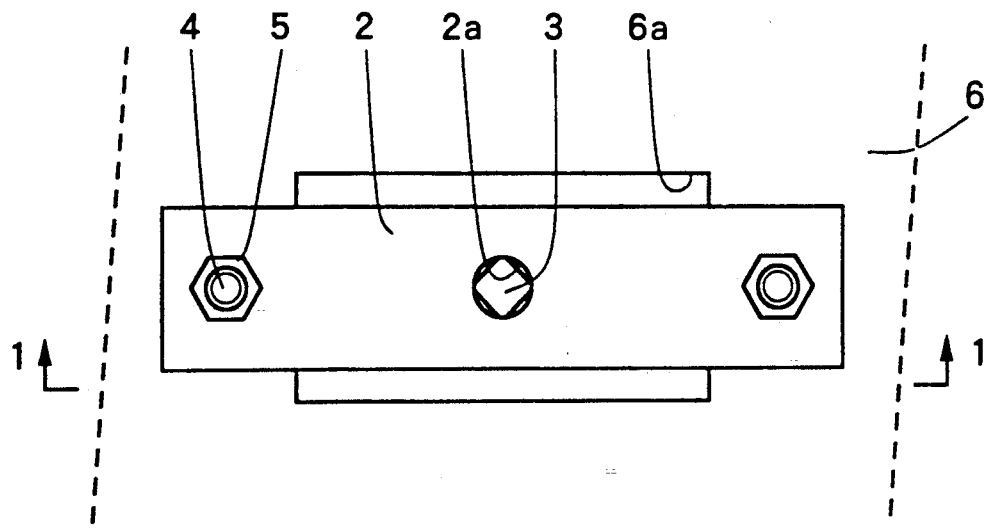
FIG. 2 is a top plan view showing the same embodiment.

The present invention will now be described in connection with one embodiment thereof. FIGS. 1 and 2 show a diagram showing an embodiment, in which the present invention is applied to a stage capable of having its height finely adjusted. This embodiment is intended to finely adjust a height H from the top surface of a base plate 7 to the top surface of the stage 6 mounted on the base plate 7. The stage 6 has a notch 6a and mounts a rectangular thick plate 1 on its bottom surface across the notch 6a and a thin plate 2 having a smaller thickness on its top surface across the notch 6a. The thick plate 1 and thin plate 2 are fixed by means of a set of bolts 4 extending through the thick plate 1, the stage 6 and the thin plate 2 and corresponding nuts 5. The thick plate 1 is formed on its bottom face with a projection 1a, which abuts against the base plate 7. The projection 1a can be made of a wear resisting material. The thin plate 2 is formed at its center with an internal thread 2a extending therethrough. In this internal thread 2a, there is fastened an externally threaded screw 3. This screw 3 has its lower end abutting against the top surface of the thick plate 1 and its upper end formed with a handle mount 3a. Although only one notch 6a is shown for the stage 6, the stage 6 is actually formed With totally three notches 6a, the not-shown ones being made same as described above.

If the screw 3 is driven with the construction thus made, the thick plate 1 is deflected downward whereas the thin plate 2 is deflected upward, because the screw 3 is fastened in the internal thread 2a of the thin plate 2 and has its leading end abutting against the thick plate 1. Hence, if the displacement (as taken positive downward) of the thick plate 1 at its central portion is designated as $\Delta h_1$, whereas the displacement (as taken positive upward) of the thin plate 2 at its central portion is designated as $\Delta h_2$, the screw 3 displaces the central portions of the both plates 1, 2 by $\Delta h$, where $\Delta h = \Delta h_1 + \Delta h_2$. However, as the stage 6 is fixed on fixing portions at the two ends of the both plates, and the projection 1a at the center of the thick plate 1 is deflected downward by $\Delta h_1$, so the stage 6 rises by $\Delta h_1$. In other words, the structure thus made has a displacement reduction rate of $\Delta h_1/\Delta h$ to the displacement input of $\Delta h$ by the screw 3. Thus, it is possible to finely adjust the height H from the top surface of the base plate 7 to the top surface of the stage 6.

Incidentally, although the present embodiment has its thick plate 1 and thin plate 2 exemplified by having a rectangular top plan shape, each plate can be formed into a trapezoid, triangle, disc or round rod. In the present embodiment the both plates have an identical top plan shape, but one member may be formed into a rectangular shape whereas the other may be formed into a trapezoidal shape, for example. In the present embodiment the both plates are given the different thicknesses, but they can be made to have an equal thickness, or the thick plate 1 can be made thinner. In the present embodiment neither the thick plate 1 nor the thin plate 2 have a thickness change, but they can be made of thickness changing members. The materials for the both plates may be an identical metallic material or different metallic materials. For example, one may be made of copper whereas the other may be made of steel.

In a second aspect, the method of fastening the both plates 1, 2 to each other is exemplified in the present embodiment indirectly through the stage 6 by the fastened by means of the contact bonding or welding. Alternatively, the two members may be integrally formed to attach the stage 6 thereto for its positioning. In the present embodiment the both plates are so fixed as to support the moments acting upon their two ends but can be fixed not to support the moments. The fixing positions of the both plates are located in the present embodiment at the two longitudinal ends of the both plates but can be located only at one longitudinal end of each of the plates. If the two members are circular or square plates, they can be fixed all over their peripheries.

In a third aspect, the input means for changing the gap between the opposed faces of the two members is exemplified in the present embodiment by the combination of the internal thread 2a formed in the thin plate 2 and the externally threaded screw 3. However, a taper member or a piezoelectric elements can be inserted into the gap between the opposed faces. Although the present embodiment is constructed to change the gap only in the stretched range where the gap can be increased by screwing into the screw 3 and decreased by screwing out the screw 3, the gap can be constructed to change either only in the narrowed range or both in the stretched and narrowed ranges. The mounting position of the input means in the present embodiment is located at the longitudinal center of the both plates, but might be any if the gap between the opposed faces of the two members could be changed.

In a fourth aspect, according to the present embodiment, the thick plate 1 is formed on its bottom surface at the longitudinal center with the projection 1a which provides a positioning reference point In spite of this, the mounting position of the projection 1a may be other than the longitudinal center of the thick plate 1. Alternatively, the projection 1a may be omitted to use the lower surface itself of the thick plate as the reference point. The reference point can be located at the upper surface side of the thick plate 1.

Here will be presented the experimental results of the present embodiment Both the thick plate 1 and the thin plate 2 were made of steel to have a width of 20 mm and an inter-bolt span of 70 mm, and the thick plate 1 had a thickness of 5 mm whereas the thin plate 2 had a thickness of 2 mm. The bolts 4 and nuts 5 used conformed to the standard of M8, and the screw 3 used conformed to the standard of M10 having a pitch of 1 mm. With this construction, the screw 3 was turned 3.6 degrees by a torque of 3.5 kgf·mm, that is, the gap between the opposed faces at the centers of the both plates had a displacement of $\Delta h = 1$ mm $\times 3.6/360 = 10$ microns in the increasing direction. The measurements of the individual displacements of the both plates at this time revealed that the thin plate 2 had its central portion deflected $\Delta h_2 = 9.4$ microns upward whereas the thick plate 1 had its central portion deflected $\Delta h_1 = 0.6$ microns downward. Thus, an output reduction rate of $\Delta h_1/\Delta h = 0.6$ microns 10 microns, i.e., about 1/17 was obtained, and it has been revealed that a fine level adjustment could be attained. The precision of repetition was about $\pm 0.05$ microns at the maximum, and a rigidity to an external force took a value of as high as 10 kgf/microns.

As has been described above, according to the finely displacing device of the present invention, it is possible to achieve such a fine displacement as has been reduced at a ratio of 1/10 to 1/50 from the total displacement of the thick and thin plates obtained by the input means, and to give the output member a high rigidity to an external force. The device is simple in construction and easy to manufacture so that it can be small-sized, the device is excellent in its portability, and the device is excellent in operation having no limit in its posture and can be easily attached to an object to be finely displaced. This finely displacing device can be applied to a finely moving portion of a working machine, a jig, a hand of a microrobot, a sample carriage of a microscope, a microcylinder, an ultra-slow motor or a rotating machine.

Although the embodiments of the present invention have been described above, various modifications are possible without departing from the spirit of the invention which is defined solely in the appended claims.

What is claimed is:

1. A fine displacement device for establishing a measured micro displacement comprising:
   first and second plate members disposed in spaced relation to each other to define a gap therebetween and fixed directly or indirectly to each other at adjacent portions thereof; and
   input means for changing said gap between said two plate members by deforming said plate members elastically in a direction perpendicular to said plate members,
   wherein a distance between a plane of said first plate member and a deformed portion of said first plate member is used as a measure for establishing said micro displacement.

2. The device according to claim 1, wherein said first plate member has a larger thickness than that of said second plate member.

3. The device according to claim 1, wherein said two plate members are made of elongated members having a larger length than a width and have their two ends fixed to each other.

4. The device according to claim 1, wherein said input means includes;
- an internally threaded hole formed through said second plate member perpendicular to a plane of said second plate member, and
- an externally threaded screw fastened in said internally threaded hole and abutting against said first plate member.

5. A fine displacement method for establishing a measured micro displacement comprising:
- arranging first and second plate members in spaced relation to each other to define a gap therebetween;
- fixing said two plate members directly or indirectly to each other at adjacent portions thereof; and
- changing said gap between said two plate members by deforming said plate members elastically upon operation of input means engaging said plate members whereby a distance between a plane of said first plate member and a deformed portion of said first plate member is the measure of said micro displacement.

6. The method according to claim 5, wherein said first plate member has a larger thickness than that of said second plate member.

7. The method according to claim 5, wherein said two plate members are made of elongated members having a larger length than a width and have their two ends fixed to each other.

8. The method according to claim 5, wherein said input means includes:
- an internally threaded hole formed through said second member perpendicular to a plane of said second member, and
- an externally threaded screw fastened in said internally threaded hole and abutting against said first plate member.

* * * * *